United States Patent
Tsukada et al.

(10) Patent No.: US 10,638,003 B2
(45) Date of Patent: Apr. 28, 2020

(54) PRINTING APPARATUS, DISPLAY METHOD OF OPERATION GUIDANCE IN PRINTING APPARATUS, AND STORAGE MEDIUM

(71) Applicant: CANON KABUSHIKI KAISHA, Tokyo (JP)

(72) Inventors: Nobuyuki Tsukada, Kawaguchi (JP); Yoshiyuki Hirai, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/048,512

(22) Filed: Jul. 30, 2018

(65) Prior Publication Data

US 2019/0052762 A1 Feb. 14, 2019

(30) Foreign Application Priority Data

Aug. 10, 2017 (JP) .................................. 2017-155901

(51) Int. Cl.
*G06F 15/00* (2006.01)
*H04N 1/00* (2006.01)

(52) U.S. Cl.
CPC ....... *H04N 1/00482* (2013.01); *H04N 1/0097* (2013.01); *H04N 1/00411* (2013.01)

(58) Field of Classification Search
CPC ........... H04N 1/00482; H04N 1/00411; H04N 1/0097
USPC ...................................................... 358/1.18
See application file for complete search history.

(56) References Cited

U.S. PATENT DOCUMENTS

| 8,169,650 B2 | 5/2012 | Hibi et al. | |
|---|---|---|---|
| 8,456,686 B2 | 6/2013 | Hibi et al. | |
| 2005/0179914 A1* | 8/2005 | Fuse | H04N 1/393 358/1.2 |
| 2012/0093526 A1* | 4/2012 | Yasui | B41J 3/46 399/21 |
| 2016/0100077 A1* | 4/2016 | Hibi | G06K 15/4065 358/1.2 |
| 2017/0257503 A1 | 9/2017 | Tsukada | |

FOREIGN PATENT DOCUMENTS

| JP | H08-7667 B2 | 1/1996 |
|---|---|---|
| JP | 2007-217140 A | 8/2007 |

* cited by examiner

*Primary Examiner* — Mark R Milia
(74) *Attorney, Agent, or Firm* — Venable LLP (57) ABSTRACT

A printing apparatus performs printing using a plurality of sheets different in size. Stored instructions are executed to act as a display control unit displaying an operation guidance on a display unit for setting a sheet in a sheet tray, and a data acquiring unit acquiring regional information of the printing apparatus. When the data acquiring unit acquires regional information indicating a first region, the display control unit displays an operation guidance including content that notifies a user of a specific operation that is to be performed on the sheet tray so that it is able to hold a sheet having a first sheet size. When the data acquiring unit acquires regional information indicating a second region which is different from the first region, the display control unit displays an operation guidance not including the content that notifies a user of the specific operation.

12 Claims, 9 Drawing Sheets

SKIP 702

PRINTING APPARATUS, DISPLAY METHOD OF OPERATION GUIDANCE IN PRINTING APPARATUS, AND STORAGE MEDIUM

BACKGROUND OF THE INVENTION

Field of the Invention

The present invention relates to an operation guidance display at the time of setting sheets in a printing apparatus.

Description of the Related Art

Conventionally, a printing apparatus including a sheet feed cassette having a mechanism of setting sheets (such as paper) by way of extending the cassette in accordance with a sheet size has been proposed (see Japanese Patent Laid-Open No. 2007-217140). By employing such a extending mechanism, an effect can be obtained such that a sheet can be easily set while suppressing the installation space of the apparatus in the state in which the sheet is not set.

In the printing apparatus including the sheet feed cassette having the above extending mechanism, if a user fails to properly extend the sheet feed cassette, failures such as improper sheet feeding and sheet jamming in the middle of the feeding may occur. Particularly, in a case where the content of the extending operation varies depending on a sheet size, the user is highly likely to make an error in the operation. In this regard, as disclosed in Japanese Patent Publication No. H08-7667(1996), for example, the user's operation error can be avoided by applying a technique of displaying operation guidance on a screen in accordance with sheet sizes.

Incidentally, for displaying operation guidance in accordance with sheet sizes, information on sheet sizes to be used for printing is required. Moreover, in order to acquire sheet size information without failure, user operation such as selecting a sheet size through an operation panel, for example, is to be required. However, forcing the user to constantly make such size selection is not desirable in terms of improving the usability of the printing apparatus.

SUMMARY OF THE INVENTION

The printing apparatus according to the present invention is a printing apparatus which is adaptable to a plurality of sheet sizes different from each other, the printing apparatus including a sheet feed unit having a plurality of sheet setting states in accordance with sheet sizes; a display control unit configured to display an operation guidance on a display unit for setting a sheet in the sheet feed unit; and a data storage unit configured to store regional information specifying a region where the printing apparatus is to be used, wherein, in a case where the printing apparatus starts in a unique startup mode that is different from a normal startup mode, the display control unit determines a content of the operation guidance based on the regional information stored in the data storage unit.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment (Configuration of Printing Apparatus)

Figure 1:
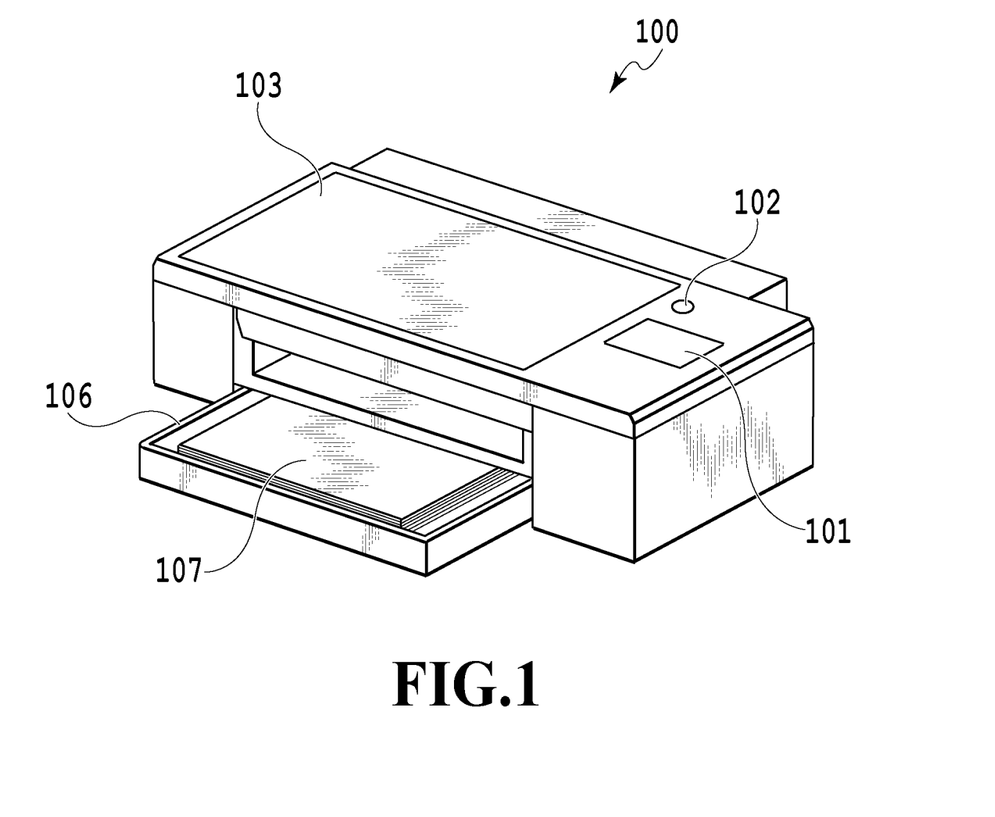
FIG. 1 is an outside view of a printing apparatus of an inkjet type.

FIG. 1 is an outside view of a printing apparatus of an inkjet type according to the present embodiment. A printing apparatus 100 includes a touch panel LCD 101, a power button 102, a document platen 103, and a sheet feed cassette 106. On the touch panel LCD 101, a screen for displaying the state of the printing apparatus 100 and a UI screen for making various settings, for example, are displayed. On the UI screen, pseudo buttons and the like are provided. A user touches those buttons with his/her finger to make various input instructions. The power button 102 is a button for switching between ON and OFF for the power source of the printing apparatus 100. The document platen 103 is a platen for placing a document at the time of using a scanner function. The sheet feed cassette 106 is a cassette (tray) for accommodating a sheet 107 as a print medium. The sheet feed cassette 106 is equipped with the above-described extending mechanism and has a plurality of sheet setting states (two states in this example, that is, the states before and after extending the cassette). The user pulls the sheet feed cassette 106 back and forth with hands to bring the cassette in an extended state. It should be noted that, in the present embodiment, the printing apparatus of an inkjet type is described by way of example, but the present invention is not limited to this. Other printing types such as an electrophotographic type may be applied as well.

Figure 2:
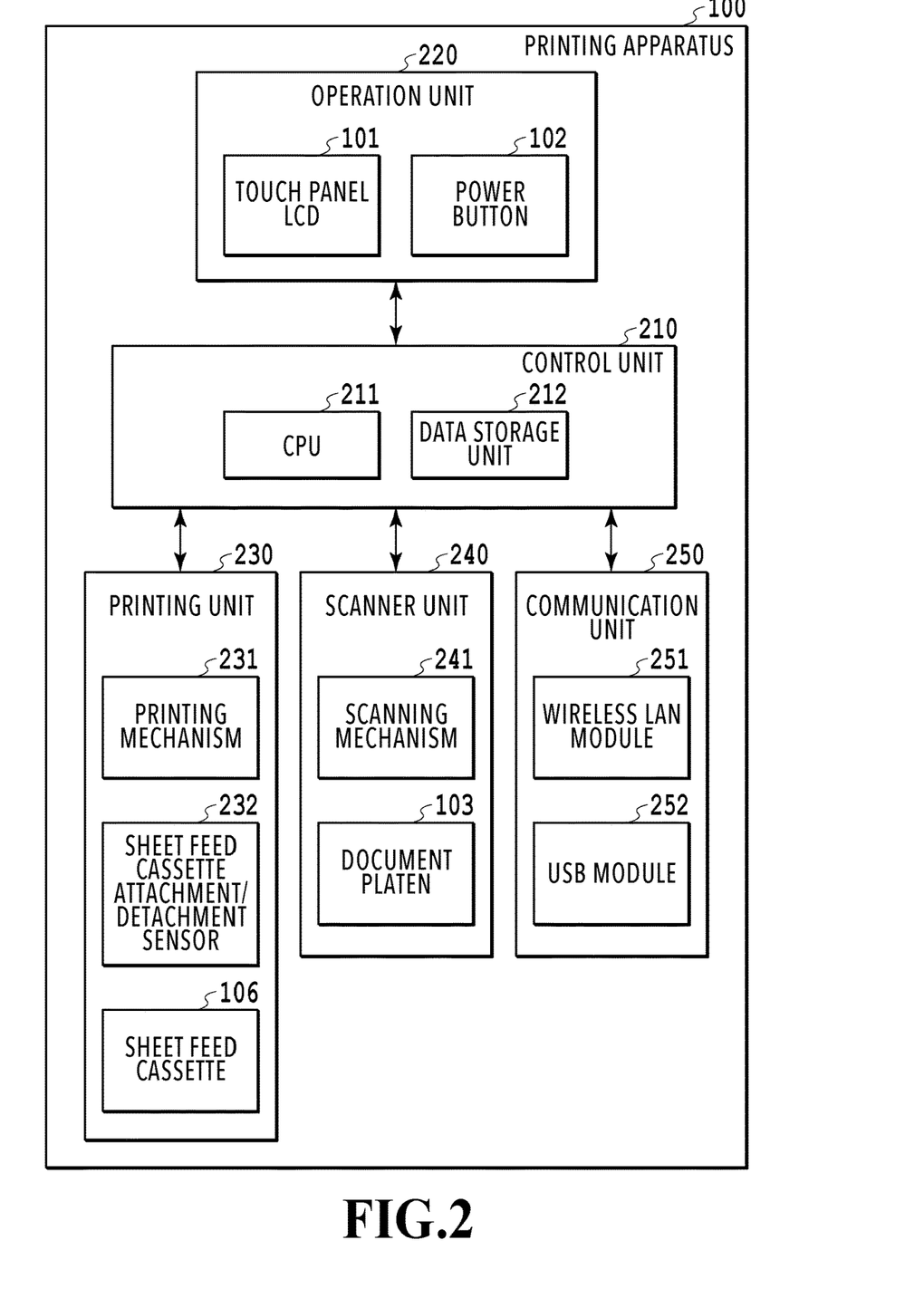
FIG. 2 is a functional block diagram of the printing apparatus.

FIG. 2 is a functional block diagram of the printing apparatus 100. The printing apparatus 100 is composed of a control unit 210, an operation unit 220, a printing unit 230, a scanner unit 240, and a communication unit 250. The control unit 210 includes a CPU 211 and a data storage unit 212, and is in charge of controlling the overall printing apparatus 100. The data storage unit 212 is composed of a ROM, a RAM, and the like, and stores various programs to be executed by the CPU 211 as well as image data, control data, and so on. The operation unit 220 is composed of the touch panel LCD 101 and the power button 102 as described above.

Figure 3A:
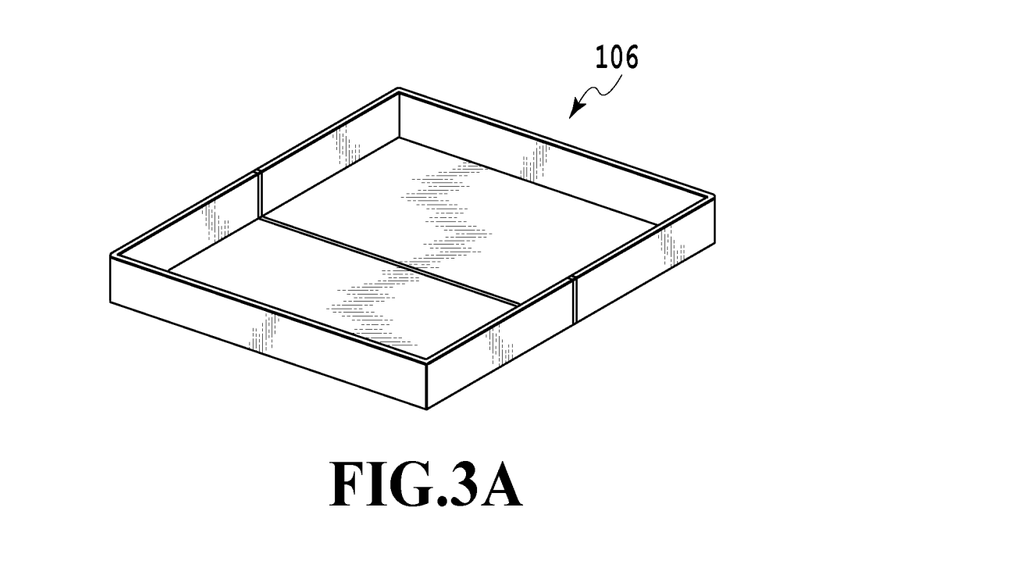
FIGS. 3A and 3B are outside views of a sheet feed cassette which is removed from a body of the apparatus.
Figure 3B:
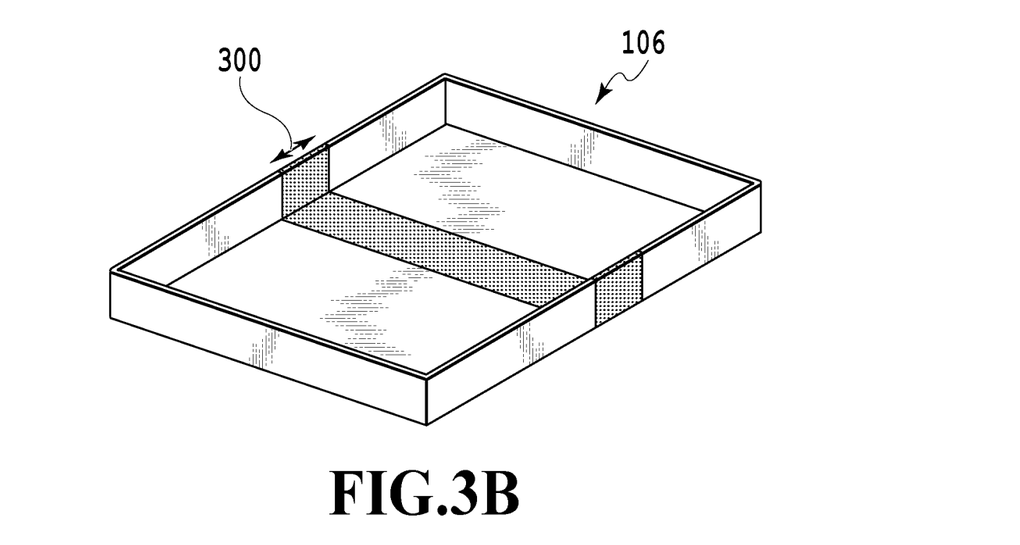

The printing unit 230 includes the above-described sheet feed cassette 106, a printing mechanism 231, and a sheet feed cassette attachment/detachment sensor 232. The printing mechanism 231 functions such that the sheet 107 is pulled from the sheet feed cassette 106 and ink is ejected from a print head (not shown) to perform printing. The sheet feed cassette attachment/detachment sensor 232 is a sensor to detect whether the sheet feed cassette 106 is attached to or detached from a body of the apparatus. FIGS. 3A and 3B are outside views of the sheet feed cassette 106 which is removed from an apparatus body. FIG. 3A shows a state before the extending (initial state) and FIG. 3B shows a state after the extending. In the state after the extending, a size becomes larger by an area shown with a two-way arrow 300 compared to the state before the extending. This allows setting sheets of different sizes. Table 1 listed below shows the relation between adaptable sheet sizes and the required/unrequired extending operation of the sheet feed cassette 106. The sheet feed cassette 106 of the present embodiment is adapted to four types of sheet sizes, that is, A4, letter, B5, and A5. Only in the case of A4 size, the sheet feed cassette 106 is required to be extended at the time of setting.

TABLE 1

| Sheet size | Extending of sheet feed cassette |
| --- | --- |
| A4 | Required |
| Letter | Not required |
| B5 | Not required |
| A5 | Not required |

The scanner unit 240 includes a scanning mechanism 241 and the above-described document platen 103. The scanning mechanism 241 functions such that light is applied from a light source (not shown) to a document placed on the document platen 103 and an image is read by an optical sensor (not shown). The communication unit 250 includes a wireless LAN module 251 and a USB module 252. The wireless LAN module 251 is a communication module for exchanging data via a wireless LAN, and the USB module 252 is a communication module for exchanging data via a USB cable.

(Activation Control at On-Arrival Startup)

Figure 4:
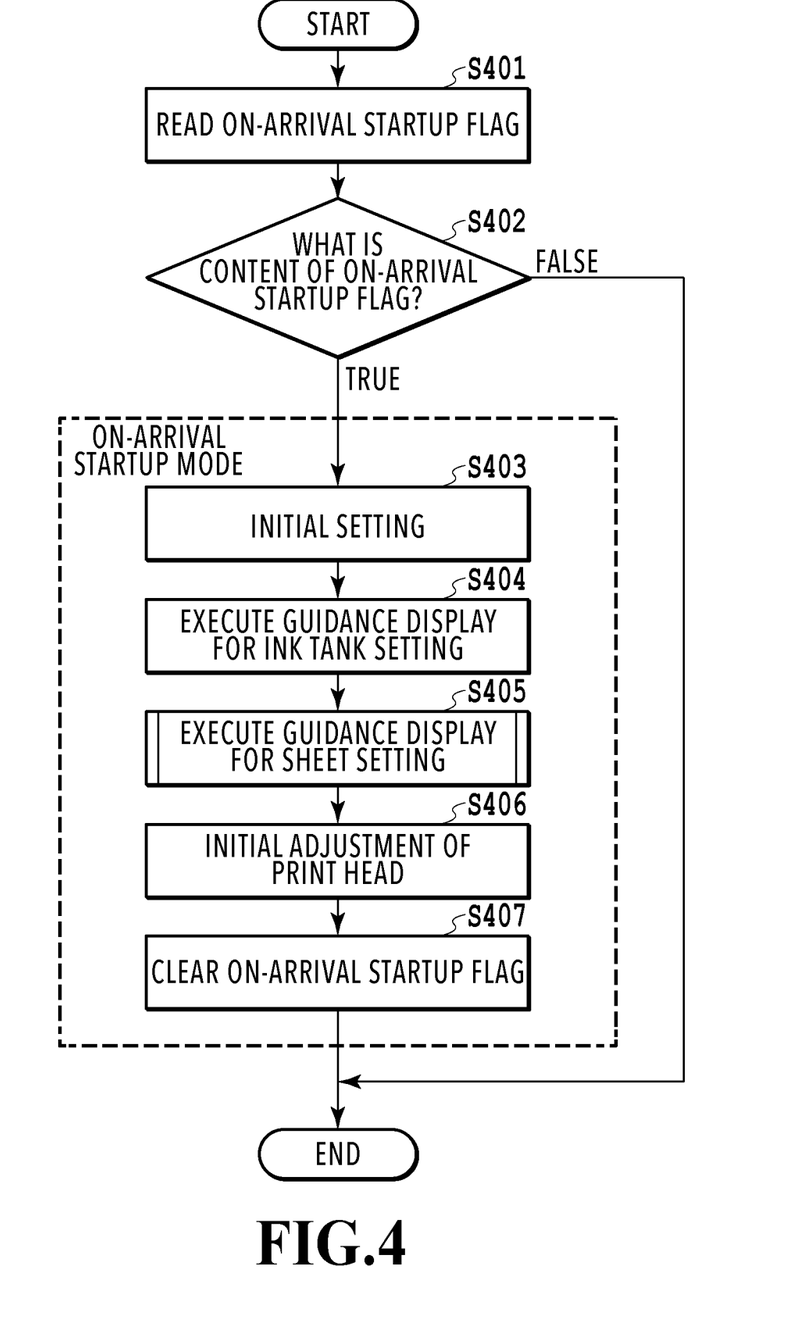
FIG. 4 is a flowchart showing the flow of startup control of the printing apparatus.

Next, an explanation will be given on the startup control of the printing apparatus 100, that is, in particular, a startup control in a unique startup mode (hereinafter also referred to as an "on-arrival startup mode") which is automatically executed at the time of an initial startup after the printing apparatus 100 arrives at the user's place. It should be noted that the on-arrival startup mode is a mode of executing an initial setup in the case of initially starting the printing apparatus 100. FIG. 4 is a flowchart showing the flow of startup control in the printing apparatus 100. A series of processing shown below is started once the user operates the power button 102 to turn on the power. To be more specific, in response to the operation of the power button 102, the CPU 211 reads out a predetermined program from the ROM in the data storage unit 212 and loads it on the RAM for execution, thereby achieving this startup.

In Step 401, a flag value of an on-arrival startup flag is read from the data storage unit 212. This flag value has either one of a value "True" indicating an initial startup after the arrival and a value "False" indicating startups other than the initial startup after the arrival (startups for second time or thereafter).

In subsequent Step 402, processing is branched in accordance with the read flag value. Specifically, if a flag value indicates "True," it is determined as the initial startup after the arrival, and the process advances to Step 403 where the startup control is executed in the on-arrival startup mode. Meanwhile, if a flag value indicates "False," it is determined that the startup processing in the on-arrival startup mode has been already executed and that an initial adjustment and the like of the print head have been completed, whereby this flow ends. In this case, the process is to be shifted to the startup control in the normal startup mode (not shown).

In Step 403, initial settings such as selecting a language to be used are made. Then, in Step 404, a guidance display showing a method of mounting an ink tank in the printing mechanism 231 (guidance display for ink tank setting) is executed. Subsequently, in Step 405, operation guidance for setting the sheet 107 in the sheet feed cassette 106 is displayed (guidance display for sheet setting). The details of the guidance display for sheet setting which is a feature of the present embodiment will be described later.

Once the ink tank setting and the sheet setting are completed, the initial adjustment of the print head (not shown) using the set ink and sheet is executed in Step 406. Specifically, the sheet 107 is firstly pulled from the sheet feed cassette 106 to perform test printing using a predetermined printing pattern. Then, the result of the test printing is optically read by the scanning mechanism 241 to optimize ink ejection timing based on the read result. After the completion of the initial adjustment of the print head, a flag value of the on-arrival startup flag is cleared (updated to "False") in Step 407. Accordingly, the startup control in the normal startup mode will thereafter be executed every time the power is turned on.

The above is the content of the startup control in the printing apparatus 100.

(Guidance Display for Sheet Setting)

Figure 5:
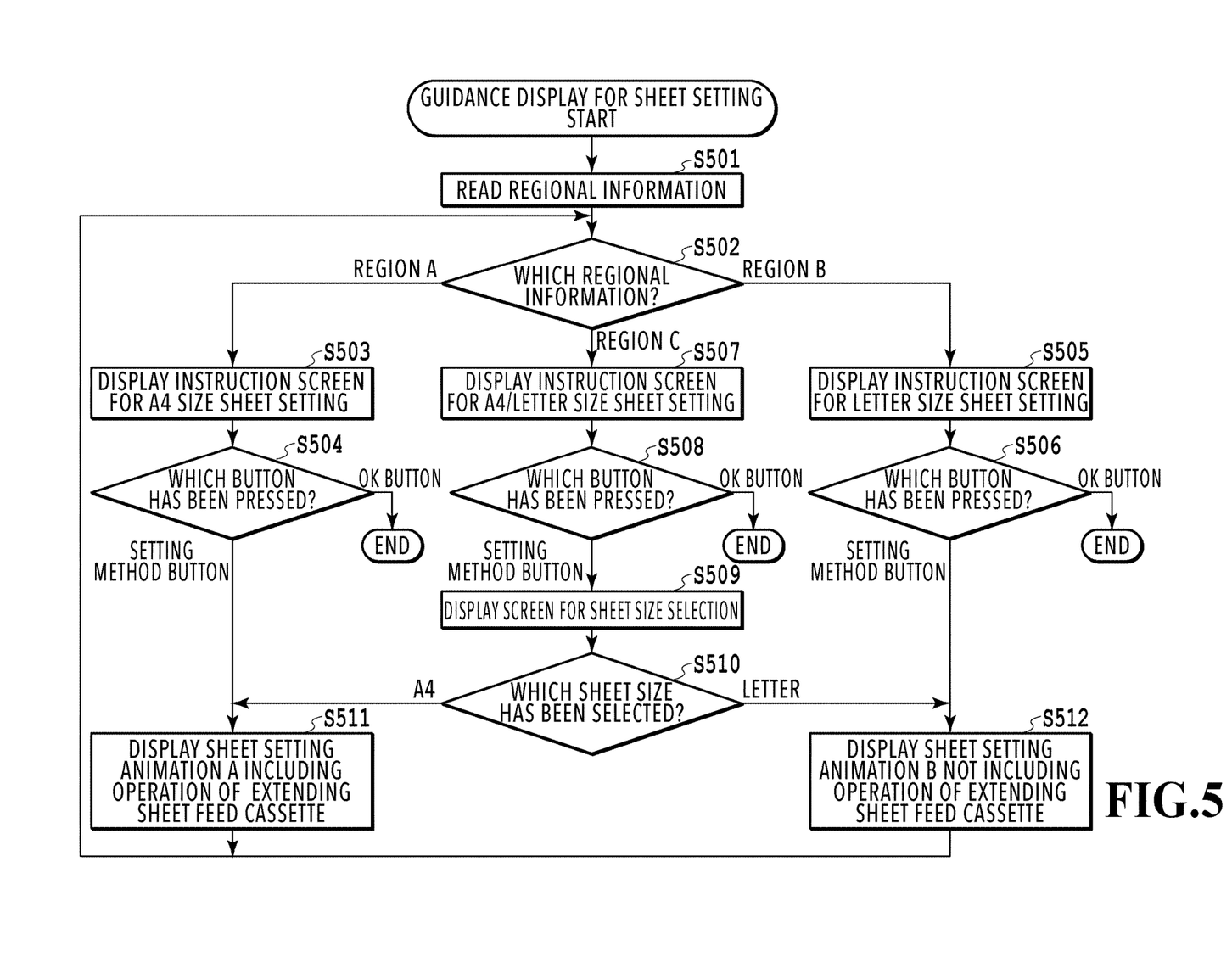
FIG. 5 is a flowchart showing the control flow of a guidance display for sheet setting in an on-arrival startup mode.

Next, guidance display for sheet setting in the above Step 405 will be described in detail. FIG. 5 is a flowchart showing the control flow of the guidance display for sheet setting (Step 405) in the on-arrival startup mode. In the present embodiment, a sheet size to be used in the initial adjustment of the print head (Step 406) is either of the two sizes, A4 and letter sizes, which are most commonly used around the world. Here, since the operation of extending the sheet feed cassette 106 is required in the case of the A4 size while such operation is unrequired in the case of the letter size (see Table 1 listed above), it is necessary to make an appropriate guidance display for sheet setting in accordance with the sheet sizes. According to the present embodiment, in order not to force a user to perform too many unfamiliar operations in the on-arrival startup mode, regional information specifying a region where the printing apparatus 100 will be in use is adopted to predict a sheet size that is highly likely to be used by the user. The contents of the guidance display for sheet setting are thus determined. It should be noted that the sheet sizes to be used for the initial adjustment of the print head are not limited to those two types, that is, the A4 and letter sizes. Nonetheless, as long as those two sheet sizes are adapted, it is possible to cover almost all regions around the world. In addition, not adapting to many other sheet sizes allows preventing the control of the initial adjustment of the print head from being too complicated and allows reducing time required for processing. Along with the flow of FIG. 5, the guidance display for sheet setting in the on-arrival startup mode will be described below in detail.

In Step 501, the above regional information stored beforehand in the ROM or the like in the data storage unit 212 is read out. Table 2 listed below is one example of the regional information, which is associated with information indicating the usage status of a sheet size by each region.

TABLE 2

| Regional information | Usage status of A4/letter size |
|---|---|
| Region A | Usage rate of A4 size is considerably high |
| Region B | Usage rate of letter size is considerably high |
| Region C | Cannot determine which one of usage rate is considerably high |

Such regional information is predetermined by each product in accordance with a region in which the printing apparatus 100 will be sold, and is stored within the data storage unit 212 in a manufacturing process before shipment. The content of the regional information may be determined by conducting market surveys in advance to grasp the usage status of a sheet size by each region.

In Step 502, processing is branched based on the read regional information. Specifically, in the case where regional information indicates "Region A," the process advances to Step 503, in the case where regional information indicates "Region B," the process advances to Step 505, and in the case where regional information indicates "Region C," the process advances to Step 507.

Figure 6A:
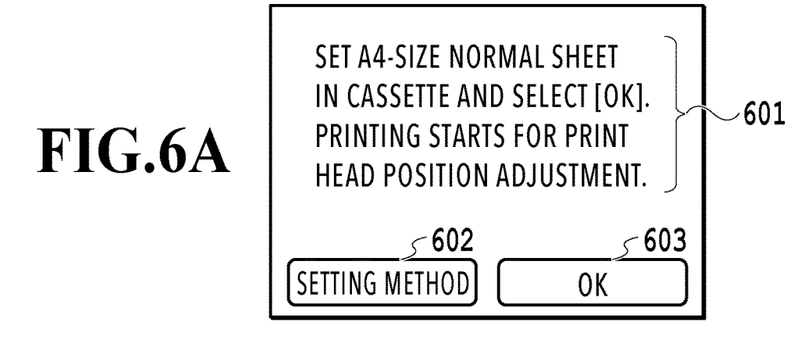
FIGS. 6A to 6D are diagrams showing one example of sheet setting instruction screens.
Figure 7A:
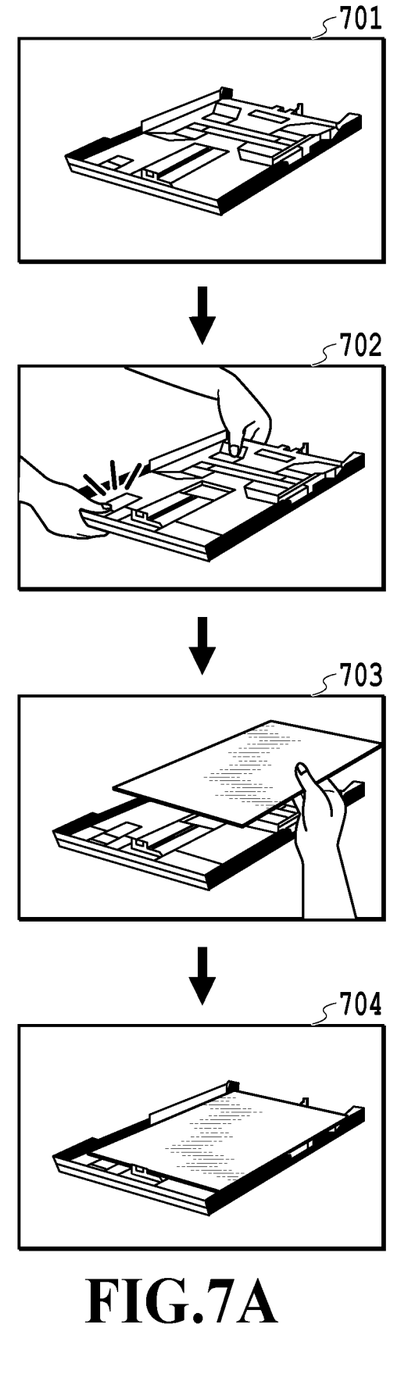
FIGS. 7A and 7B are diagrams showing one example of the display contents of sheet setting animation.

In Step 503 where a case is determined as Region A, a UI screen (sheet setting instruction screen) instructing the user to set the A4 size sheet which is adapted to Region A is displayed. FIG. 6A shows one example of a sheet setting instruction screen to be displayed in the case where the regional information indicates "Region A." The sheet setting instruction screen of FIG. 6A has an explanatory message 601 which urges the user to set the A4 size sheet, a "setting method" button 602 for displaying animation that explains a sheet setting method, and an "OK" button 603 for completing the guidance display for sheet setting. The user who has already read an instruction manual, for example, and knows a method of setting the A4 size sheet presses (touch operation) the "OK" button 603. Meanwhile, the user who does not know the method of setting the A4 size sheet presses the "setting method" button 602. Then, in Step 504, processing is branched in accordance with the content of the button operation. In the case where the "OK" button 603 is pressed, the guidance display for sheet setting ends. On the other hand, in the case where the "setting method" button 602 is pressed, the process advances to Step 511. In Step 511 where a sheet size is the A4 size, animation (hereinafter referred to as sheet setting animation A) constituted by a plurality of images showing a series of operations, including the operation of extending the sheet feed cassette 106, to be conducted by the user is displayed on the screen. FIG. 7A is a diagram showing one example of the display content of the sheet setting animation A. Numerals 701 to 704 show representative images (pictures) which are displayed in this sheet setting animation A. Among them, an image denoted as the numeral 702 represents operation of extending the sheet feed cassette 106. Accordingly, the user recognizes that the operation of extending the sheet feed cassette 106 is required, and thus extends the sheet feed cassette 106 with reference to the image of the numeral 702.

Figure 6B:
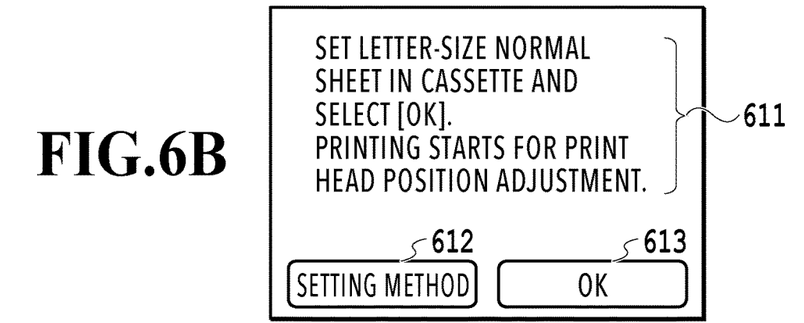
Figure 7B:
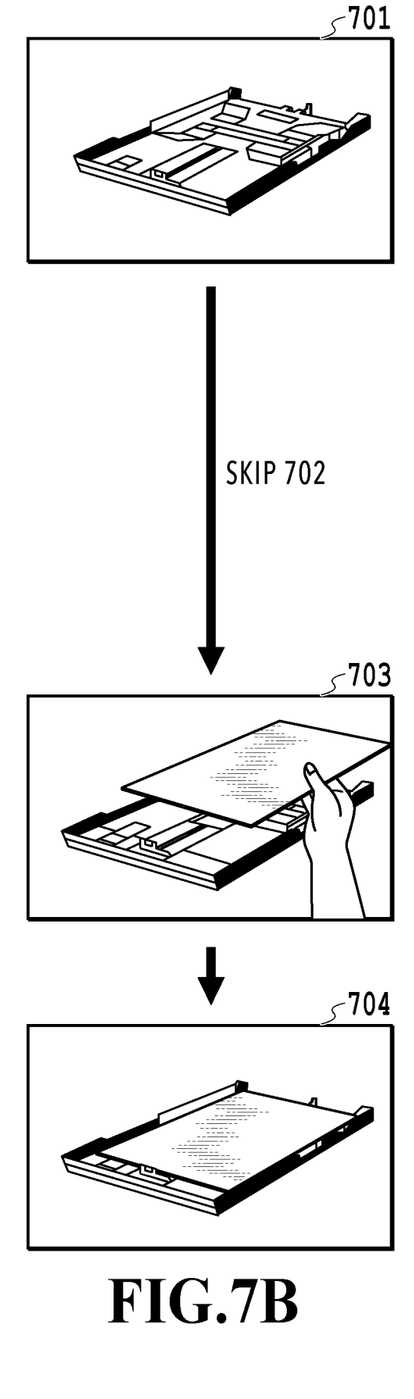

Next, in Step 505 where a case is determined as Region B, a UI screen (sheet setting instruction screen) instructing the user to set a letter size sheet which is adapted to Region B is displayed. FIG. 6B shows one example of a sheet setting instruction screen to be displayed in the case where the regional information indicates "Region B." The sheet setting instruction screen of FIG. 6B has an explanatory message 611 which urges the user to set the letter size sheet, a "setting method" button 612 for displaying animation that explains a sheet setting method, and an "OK" button 613 for completing the guidance display for sheet setting. The user who knows a method of setting the letter size sheet presses the "OK" button 613. Meanwhile, the user who does not know the setting method presses the "setting method" button 612. In Step 506, processing is branched in accordance with the content of button operation. In the case where the "OK" button 613 is pressed, the guidance display for sheet setting ends. On the other hand, in the case where the "setting method" button 612 is pressed, the process advances to Step 512. In Step 512 where a sheet size is the letter size, sheet setting animation (hereinafter referred to as sheet setting animation B) that does not include the operation of extending the sheet feed cassette 106 is displayed on the screen. FIG. 7B is a diagram showing one example of the display content of sheet setting animation B. As is evident in comparison with FIG. 7A, the case of the letter size does not need the extending operation of the sheet feed cassette 106, and thus the image of the numeral 702 is not included in the images. Accordingly, the user recognizes that the extending operation of the sheet feed cassette is not required.

Figure 6C:
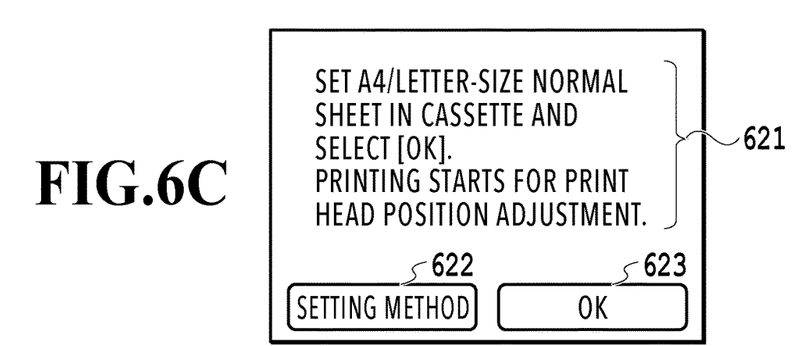
Figure 6D:
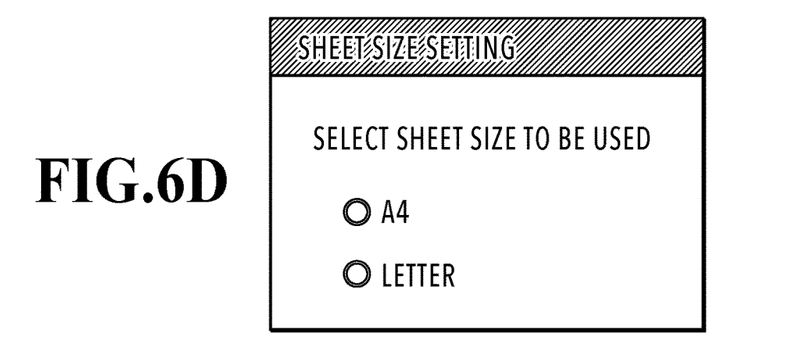

Next, in Step 507 where a case is determined as Region C, a UI screen (sheet setting instruction screen) instructing the user to set either the A4 size or letter size sheet is displayed. FIG. 6C shows one example of a sheet setting instruction screen to be displayed in the case where the regional information indicates "Region C." The sheet setting instruction screen of FIG. 6C has an explanatory message 621 which urges the user to set the A4 size or letter size sheet, a "setting method" button 622 for displaying animation that explains a sheet setting method, and an "OK" button 623 for completing the guidance display for sheet setting. The user who knows a method of setting the A4 size or letter size sheet presses the "OK" button 623. Meanwhile, the user who does not know the setting method presses the "setting method" button 622. In Step 508, processing is branched in accordance with the content of the button operation. In the case where the "OK" button 623 is pressed, the guidance display for sheet setting ends. On the other hand, in the case where the "setting method" button 622 is pressed, the process advances to Step 509, where a sheet size selection screen is displayed. FIG. 6D is a diagram showing one example of the sheet size selection screen. The user selects either the A4 size or the letter size by way of a radio button. In Step 510, processing is branched in accordance with the content of the selection. In the case where the A4 size is selected through the sheet size selection screen, the process advances to Step 511, where the sheet setting animation A of FIG. 7A including the operation of extending the sheet feed cassette is displayed. On the other hand, in the case where the letter size is selected, the process advances to Step 512, where the sheet setting animation B of FIG. 7B that does not include the operation of extending the sheet feed cassette is displayed. The above is the content of the display control of the operation guidance for setting sheets in the on-arrival startup mode.

Figure 8:
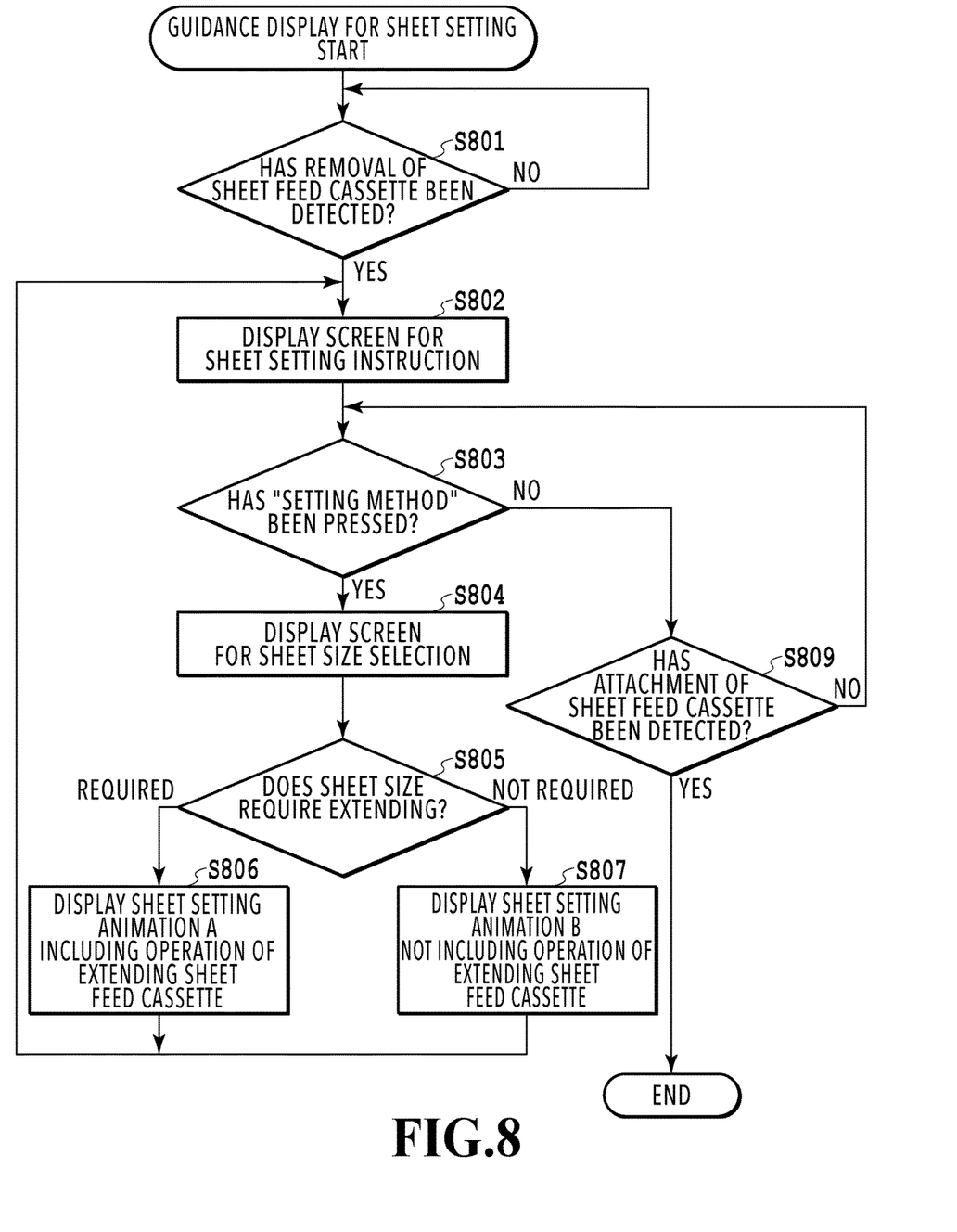
FIG. 8 is a flowchart showing the control flow of a guidance display for sheet setting in a normal startup mode.

Incidentally, in the normal startup mode as well, the guidance display for sheet setting is made according to necessity. FIG. 8 is a flowchart showing the control flow of guidance display for sheet setting in the normal startup mode. An explanation will be simply given below along with the flow of FIG. 8.

Figure 9A:
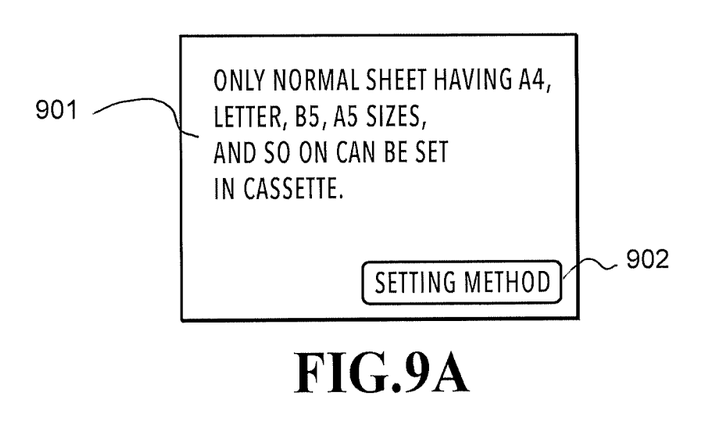
FIGS. 9A and 9B are diagrams showing one example of UI screens in the normal startup mode.

In a case where the sheet feed cassette attachment/detachment sensor 232 detects removal of the sheet feed cassette 106 (Yes in Step 801), the sheet setting instruction screen is displayed on the touch panel LCD 101 (Step 802). FIG. 9A shows one example of the sheet setting instruction screen in the normal startup mode. The sheet setting instruction screen of FIG. 9A has an explanatory message 901 indicating sheet sizes that are usable and a "setting method" button 902 for displaying animation that explains a sheet setting method. The user who knows a method of setting a sheet in the sheet feed cassette 106 promptly sets the sheet 107 in the sheet feed cassette 106 and attaches it to the printing apparatus 100 body. Once the sheet feed cassette attachment/detachment sensor 232 detects the attachment of the sheet feed cassette 106 (Yes in Step 809), this processing ends. In other words, the guidance display for sheet setting will not be made in this case.

Figure 9B:
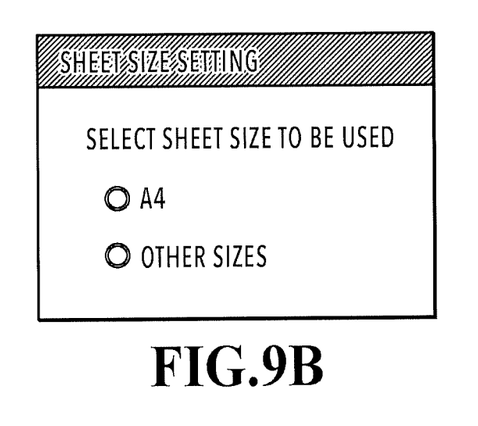

Meanwhile, the user who does not know a method of setting a sheet in the sheet feed cassette 106 presses the "setting method" button 902 (yes in Step 803). Then, the sheet size selection screen is displayed (Step 804). FIG. 9B is a diagram showing one example of the sheet size selection screen in the normal startup mode. The user selects, as in the case of the sheet size selection screen of FIG. 6D, either the A4 size or other sizes by way of a radio button. Then, if the A4 size that requires the extending operation is selected (Yes in Step 805), the sheet setting animation including the operation of extending the sheet feed cassette 106 is displayed (Step 806). On the other hand, if the other sizes that require no extending operation are selected (No in Step 805), the sheet setting animation that does not include the operation of extending the sheet feed cassette 106 is displayed (Step 807). As such, the guidance display for sheet setting is made in the normal startup mode.

As described above, according to the present embodiment, appropriate guidance display in accordance with a sheet size that is highly likely to be used is made by referring to the regional information stored in the printing apparatus beforehand at the on-arrival startup without forcing the user too much to make sheet size selection. Further, at the time of the normal startup, appropriate guidance display for setting a sheet is also made for the user who uses a sheet size that is different from the content of the regional information by allowing the user to always select a sheet size to be used. As a result, the usability of the printing apparatus will be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, appropriate operation guidance in accordance with a sheet size to be used can be displayed without forcing the user too much to make sheet size selection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-155901, filed Aug. 10, 2017 which is hereby incorporated by reference in its entirety.

What is claimed is:

1. A printing apparatus which is able to perform printing using a plurality of sheets different in size from each other, the printing apparatus comprising:
   a sheet tray configured to hold a plurality of sheet sizes including a first sheet size and a second sheet size which is different from the first sheet size;
   at least one memory containing instructions; and
   at least one processor executing the instructions to cause the printing apparatus to act as:
   a determination unit configured to determine whether the printing apparatus is in an initial setup mode,
   a display control unit configured to display an operation guidance on a display unit for setting a sheet in the sheet tray, based on a predetermined user instruction; and
   a data acquiring unit configured to acquire regional information of the printing apparatus,
   wherein, in a first case where the determination unit determines that the printing apparatus is in the initial setup mode, and the data acquiring unit acquires regional information indicating a first region, a sheet size used in printing in an initial startup mode is fixed to the first sheet size without a size selection by a user, and the display control unit displays a first operation guidance including content that notifies the user of a specific user operation that is to be performed on the sheet tray so that the sheet tray is able to hold a sheet having the first sheet size, based on the predetermined user instruction,
   wherein, in a second case where the determination unit determines that the printing apparatus is in the initial setup mode, and the data acquiring unit acquires regional information indicating a second region which is different from the first region, a sheet size used in printing in the initial startup mode is fixed to the second sheet size without a size selection by the user, and the display control unit displays a second operation guidance not including the content that notifies the user of the specific user operation, based on the predetermined user instruction, wherein, in a third case where the determination unit determines that the printing apparatus is in the initial setup mode, and the data acquiring unit acquires regional information indicating a third region which is neither the first region nor the second region, a sheet size used in printing in the initial startup mode is determined to be either the first sheet size or the second sheet size based on a size selection by the user, and the display control unit displays either the first operation guidance or the second operation guidance, based on the predetermined user instruction.

2. The printing apparatus according to claim 1, wherein the specific user operation is an operation to extend the size of the sheet feed tray that allows the sheet tray to hold a sheet having the first sheet size.

3. The printing apparatus according to claim 1, wherein the first operation guidance and the second operation guidance are animation composed of a combination of a plurality of images to show operation to be followed by a user.

4. The printing apparatus according to claim 1, wherein only in a case where the printing apparatus is in an initial setup mode that is activated when the printing apparatus is initially powered on by a user, the display control unit displays, without displaying the selection item, the first operation guidance including the content that notifies the user of the specific operation, based on the acquired regional information indicating the first region.

5. The printing apparatus according to claim 1, wherein in an initial setup mode that is activated when the printing apparatus is initially powered on by a user, test printing for adjusting the printing apparatus is performed.

6. The printing apparatus according to claim 5, wherein
the printing apparatus is a printing apparatus of an inkjet type, and
the test printing is printing for adjusting ink ejection timing in a print head.

7. The printing apparatus according to claim 5, wherein the test printing is performed after any of the first operation guidance, the second operation guidance, and the third operation guidance is displayed, and a sheet is held in the sheet tray.

8. The printing apparatus according to claim 1, wherein the selection item allows selecting either the first sheet size or the second sheet size, and does not allow selecting a sheet size different from the first sheet size and the second sheet size.

9. The printing apparatus according to claim 1, wherein a selection item that allows a user to select either the first sheet size or the second sheet size is not displayed in response to the predetermined user instruction in the first case and the second case, and the selection item is displayed in response to the predetermined user instruction in the third case, and
wherein, in the third case, the first operation guidance including the content that notifies the user of the specific use operation is displayed if the user selects the first sheet size on the selection item, and the second operation guidance not including the content that notifies the user of the specific user operation is displayed if the user selects the second sheet size on the selection item.

10. The printing apparatus according to claim 1, wherein in a normal printing mode, printing can be performed using a sheet having a size different from the second sheet size even in the first region, and printing can be performed using a sheet having a size different from the first sheet size even in the second region.

11. A display method of an operation guidance in a printing apparatus which is able to perform printing using a plurality of sheets different in size, the printing apparatus including a sheet tray configured to hold a plurality of sheet sizes including a first sheet size and a second sheet size which is different from the first sheet size, and a data storage unit configured to store regional information specifying a region where the printing apparatus is to be used, the display method comprising the steps of:
determining whether the printing apparatus is in an initial setup mode,
in a first case where it is determined the printing apparatus is in the initial setup mode, and a data acquiring unit acquires regional information indicating a first region, fixing a sheet size used in printing in an initial startup mode to the first sheet size, without a size selection by a user, and displaying a first operation guidance including a content that notifies the user of a specific user operation that is to be performed on the sheet tray so that the sheet tray is able to hold a sheet having the first sheet size, based on predetermined user instruction,
in a second case where it is determined the printing apparatus is in the initial setup mode, and the data acquiring unit acquires regional information indicating a second region which is different from the first region, fixing a sheet size used in printing in the initial startup mode to the second sheet size, without a size selection by the user, and displaying a second operation guidance not including the content that notifies the user of the specific user operation, based on the predetermined user instruction,
wherein, in a third case where it is determined the printing apparatus is in the initial setup mode, and the data acquiring unit acquires regional information indicating a third region which is different from the first region and the second region, selecting a sheet size used in printing in the initial startup mode to be either the first sheet size or the second sheet size by the user, and displaying either one of the first operation guidance or the second operation guidance, based on the predetermined user instruction, and
displaying an operation guidance for setting a sheet in the sheet tray based on the acquired regional information.

12. A non-transitory computer readable storage medium storing a program for causing a computer to perform a display method of an operation guidance in a printing apparatus which is able to perform printing using a plurality of sheets different in size, the printing apparatus including a sheet tray configured to hold a plurality of sheet sizes including a first sheet size and a second sheet size, which is different from the first sheet size, and a data storage unit configured to store regional information specifying a region where the printing apparatus is to be used, the display method comprising the steps of:
determining whether the printing apparatus is in an initial startup mode,
in a first case where it is determined the printing apparatus is in the initial setup mode, and a data acquiring unit acquires regional information indicating a first region, fixing a sheet size used in printing in the initial startup mode to the first sheet size, without a size selection by a user, and displaying a first operation guidance including content that notifies the user of a specific user operation that is to be performed on the sheet tray so that the sheet tray is able to hold a sheet having the first sheet size, based on predetermined user instructions, in a second case where it is determined the printing apparatus is in the initial setup mode, and the data acquiring unit acquires regional information indicating a second region which is different from the first region, fixing a sheet size used in printing in the initial startup mode to the first sheet size, without a size selection by the user, displaying a second operation guidance not including the content that notifies the user of the specific user operation, based on the predetermined user instruction, wherein, in a third case where it is determined the printing apparatus is in the initial setup mode, and the data acquiring unit acquires regional information indicating a third region which is different from the first region and the second region, selecting a sheet size used in printing in the initial startup mode to be either the first sheet size or the second sheet size by the user, and displaying either one of the first operation guidance or the second operation guidance, based on the predetermined user instruction, and displaying an operation guidance for setting a sheet in the sheet feed unit based on the acquired regional information.

* * * * *